United States Patent

Odisho

[11] Patent Number: 5,758,100
[45] Date of Patent: May 26, 1998

[54] DUAL VOLTAGE MODULE INTERCONNECT

[75] Inventor: Victor Odisho, Fremont, Calif.

[73] Assignee: Sun Microsystems, Inc., Mountain View, Calif.

[21] Appl. No.: 675,256

[22] Filed: Jul. 1, 1996

[51] Int. Cl.$^6$ .................... G06F 13/00; G06F 1/00
[52] U.S. Cl. ............ 395/282; 395/750.08; 307/42; 307/75
[58] Field of Search .............. 365/226; 361/794; 307/42, 75; 395/750, 431, 432, 282, 822

[56] References Cited

U.S. PATENT DOCUMENTS

| | | | |
|---|---|---|---|
| 5,329,491 | 7/1994 | Brown et al. | 365/226 |
| 5,421,734 | 6/1995 | MacWilliams | 439/59 |
| 5,490,117 | 2/1996 | Oda et al. | 365/226 |
| 5,497,037 | 3/1996 | Lee et al. | 307/42 |

OTHER PUBLICATIONS

PCI Special Intrest Group, "PCI Local Bus Specification", Chapter 4, pp. 85–97, Apr. 30, 1993.

*Primary Examiner*—Jack B. Harvey
*Assistant Examiner*—Jigar Pancholi
*Attorney, Agent, or Firm*—Blakely Sokoloff Taylor & Zafman

[57] ABSTRACT

A component card interconnect apparatus for coupling a component card to a computer system. A component card includes a first group of in-line pins with first power pins for conveying a first voltage and a second group of in-line pins with second power pins for conveying a second voltage. The second voltage is lower than the first voltage. Either the first or the second voltage is conveyed at one time.

6 Claims, 2 Drawing Sheets

DUAL VOLTAGE MODULE INTERCONNECT

FIELD OF THE INVENTION

The present invention relates to the field of computer systems. More particularly, the present invention relates to the field of component cards inserted into buses of computer systems.

BACKGROUND OF THE INVENTION

Computer systems and computer components are being developed to operate using lower and lower voltages. It is currently typical for older systems to operate with 5 volts and for newer systems to operate with 3.3 volts. As systems are developed to operate with lower voltages, problems of compatibility between systems and add-on components can occur. For example, a purchaser of a new system using a lower voltage than the old one may wish to continue using add-on memory modules from the old system because buying new memory modules would be expensive. Even though 3.3 volt systems are able to supply both 3.3 and 5 volts to components, current 3.3 volt systems incur difficulties when using previous, 5 volt components. For example, it may be necessary to provide special component sockets and cards for each voltage to prevent a component card from inadvertently being inserted in a socket with an improper voltage, causing it to be damaged. Supplying extra sockets on a system printed circuit board, however, uses up board space, which should be avoided.

Problems can also occur with the use of a 3.3 volt peripheral card in 5 volt signaling environment. The concern described above regarding accidental damage to components due to their receiving an improper voltage exists.

What is needed is an interconnect which allows interchangeable component cards to operate satisfactorily over different voltages without the addition of extra sockets.

SUMMARY OF THE INVENTION

Accordingly, it is an object of the invention to provide a component interconnect for components using either of two, different voltages.

As will be seen, the present invention provides a novel computer module interconnect which allows a system operating predominantly with a newer, lower voltage to use newer, lower voltage components or older, higher voltage components. The present invention provides this functionality with only one type of card and socket, while alleviating prior signal corruption problems.

A component card interconnect apparatus for coupling a component card to a computer system is described. The interconnect apparatus comprises a component card, including a first group of in-line pins with first power pins for conveying a first voltage and a second group of in-line pins with second power pins for conveying a second voltage. The second voltage is lower than the first voltage. Either the first or the second voltage is conveyed at one time.

DETAILED DESCRIPTION OF THE PREFERRED EMBODIMENT

The present invention as described below operates in a computer system supplying both a higher voltage and a lower voltage to system components, for example 5 volts and 3.3 volts. The component card of the present invention can include 5 volt integrated circuits (ICs) or 3.3 volt ICs. When 5 volt ICs are used, however, other components of the system receiving signals from the component card should be 5 volt input/output (I/O) tolerant to avoid damage to the other components. For example, in an embodiment in which the component card is a 5 volt memory module, a 3.3 volt memory controller communicating with the component card should be capable of receiving signals at a higher voltage than 3.3 volts without damage.

Figure 1:
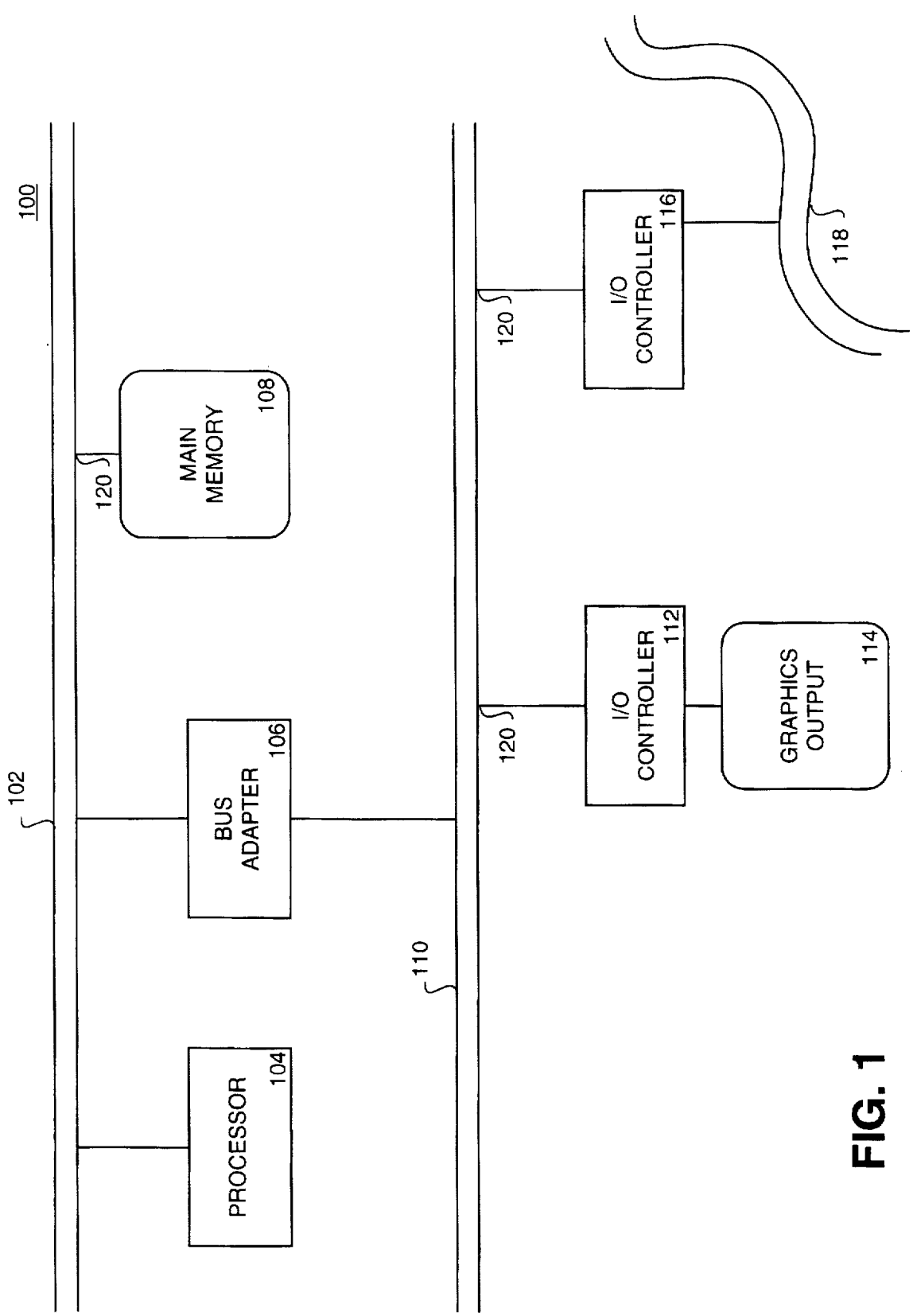
FIG. 1 is a block diagram of a portion of a computer system of the present invention.

FIG. 1 is a block diagram of a portion 100 of a computer system of the present invention. Portion 100 includes memory bus 102. Processor 104 and main memory 108 are coupled to memory bus 102. Processor 104 accesses data from main memory 104 through memory bus 102. Main memory 108 includes random access memory (RAM). For this embodiment, RAM is in the form of component cards or modules which contain IC RAMs and attach to memory bus 108 at interconnect 120. Component cards and interconnects will be described more fully below. In other embodiments, additional components could be coupled to memory bus 102.

Bus adapter 106 coupled to memory bus 102 and I/O bus 110 performs functions that allow the transfer of data between the two buses. For example, bus adapter 106 controls "traffic" between the buses to prevent data collisions. I/O bus 110 transfers data entering or exiting portion 100 from and to network bus 118. Network bus 118 connects to different processors in the computer system. I/O controllers 112 and 116 are examples of types of I/O controllers attachable to I/O bus 110 for facilitating specific types of communication between portion 100 and devices exterior to portion 100. For example, I/O controller 112 is a graphics controller receiving data from processor 104 and producing graphics output 114. I/O controller 116 is a network controller managing communications between network bus 118 and I/O bus 110. For this embodiment, I/O controllers 112 and 116 are component cards including ICs performing the appropriate functions. Other embodiments could include additional I/O controllers. Controllers 112 and 116 attach to I/O bus 110 at interconnects 120 as shown.

Computer system portion 100 is physically embodied in a printed circuit board (not shown) comprising ICs coupled to the proper circuit traces, or paths, on the printed circuit board.

Figure 2A:
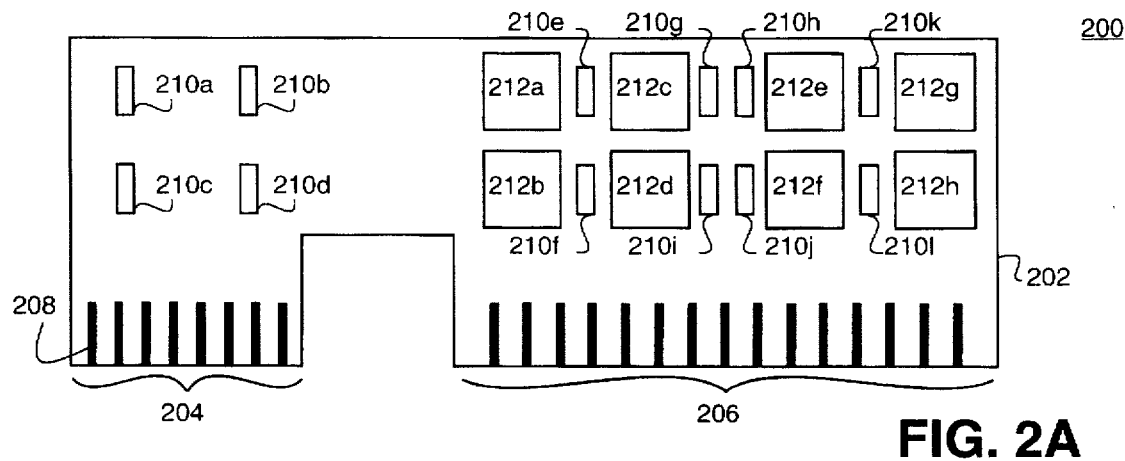
FIG. 2A is a simplified illustration of an embodiment of the dual voltage component card of the present invention.
Figure 2B:
FIG. 2B is an end view of the embodiment illustrated in FIG. 2A.
Figure 2C:
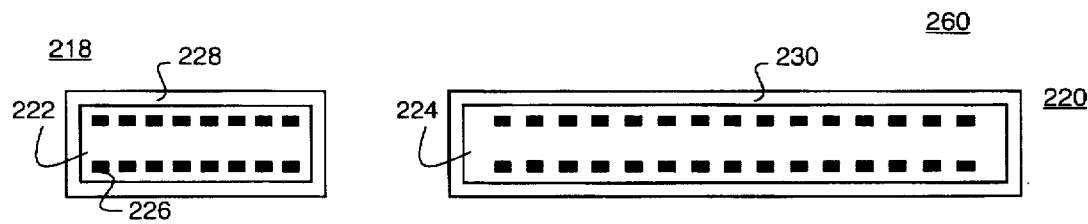
FIG. 2C is a simplified illustration of an embodiment of the dual voltage socket of the present invention.

FIG. 2A shows a simplified illustration 200 of an embodiment of dual voltage component card 202 of the present invention. For this embodiment, dual voltage component card 202 is a memory component card, or memory module. It will be apparent to one of ordinary skill in the art that other types of functionality may be supported on such a card. For example, a component card like component card 202 could be a network card or a graphics card. FIG. 2B shows an end view 240 of component card 202. FIG. 2C is a simplified illustration of an embodiment 260 of a dual voltage component card socket capable of receiving component card 202. Component card 202 includes pin groups 204 and 206, where pin 208 is called out for example. Pin 208 is identical physically to all other pins in pin groups 204 and 206, but various pins are used for different functions. Pin groups 204 and 206 and socket 260 make up interconnect 120.

Referring to FIG. 2A, pin 208 is formed by depositing a highly conductive material, for example gold, onto component card 202. In this situation, the distance between pins in pin groups 204 and 206 is not indicative of actual pin placement, but is so shown for illustration. The actual configuration of the pins themselves and the distance between them, for this embodiment, is standard and well known for conventional component cards. The number of pins shown in pin groups 204 and 206 is less than an actual number of pins typically used in the preferred embodiment. While the exact number of pins in each group can vary, an embodiment of the invention uses 32 pins in group 204 and 200 pins in group 206.

IC RAMs 212a–212h are attached to component card 202 so that pins of the RAMs electrically connect to circuit paths of component card 202. The circuit paths communicate with pin groups 204 and 206. Pin group 204 comprises pins for power and ground. Pin group 206 comprises pins for power, ground and signal, where signal can be any kind of information signal sent or received by the RAMs, for example, signals for data, address or control. The power voltage for pin group 204 is lower than the power voltage for pin group 206. For this embodiment, the lower voltage is 3.3 volts and the higher voltage is 5 volts.

Component card 202 can be used with 5 volt RAMs 212a–212h or with 3.3 volt RAMs 212a–212h. When 3.3 volt RAMs 212a–212h are used, pin group 204 provides ground and power for RAMs 212a–212h and pin group 206 provides signal pins. When 5 volt RAMs 212a–212h are used, power and ground are provided as described below. Because the distance traveled by the power signals is large relative to, for example, the distance between pins 206 and RAMs 212a–212h, a possibility of voltage droop exists. To help ensure that the voltage signal will be at an acceptable level when supplied to RAMs 212a–212h, capacitors 210a–210d are provided. Capacitors 210a–210d are connected between power pins of pins 204 and power pins of RAMs 212a–212h to sustain the lower voltage level provided via pin group 204, thereby alleviating voltage droop.

When 3.3 volt RAMs 212a–212h are used, 5 volts may still be supplied to the power pins of pin group 206. Because the 5 volts is not presented to RAMs 212a–212h, however, the 5 volt supply represents an unterminated line. As is well known in the art, unterminated lines can cause problem with signals being transmitted close by, for example ground bounce and crosstalk. To help preserve 3.3 volt signal integrity, capacitors 210e–210l are connected through one terminal to a 5 volt pin of pin group 206 and through the other terminal to a ground pin of pin group 206. This provides a ground return for 5 volt signals on power pins of pin group 206 when 3.3 volt RAMs 212a–212h are used, thereby alleviating ground bounce and crosstalk.

When component card 202 is used with 5 volt RAMs 212a–212h, voltage, ground and signal are all supplied to RAMs 212a–212h by pins 206. In this situation, pins 204 and capacitors 210a–210d are not used.

FIG. 2B shows end view 240 of component card 202. For this embodiment, component card 202 is a dual in-line memory module (DIMM). Dual in-line modules, or component cards, have row of pins on each side of the component card to allow for the receipt and transmission of more signals than is possible with single in-line modules. For other embodiments, component card 202 could be a single in-line memory module (SIMM), with pins on only one side.

FIG. 2C shows a simplified illustration of an end view of an embodiment 260 of a dual voltage component card socket of the present invention. FIG. 2C shows the end of socket 260 into which component card 202 is installed. The opposite end of socket 220 (not shown) is electrically coupled to a printed circuit board in portion 100 of the computer system of FIG. 1.

Socket 260 includes lower voltage section 218 and higher voltage section 220. For this embodiment the lower voltage is 3.3 volts and the higher voltage is 5 volts. Section 218 includes housing 228 and connector area 222. 16 connectors are shown in connector area 222 for contacting pins of pin group 204 when component card 202 is inserted into socket 260. For example pin 208 contacts connector 226. Opposite ends of connectors in connector area 226 (not shown) are electrically coupled to appropriate circuit paths on the printed circuit board, for example, by soldering or friction coupling. For this embodiment, connectors of connector area 226 are coupled to ground and 3.3 volt paths.

5 volt section 220 includes housing 230 and connector area 224. Section 220 functions with component card 202 as described with respect to section 218. The connectors of connection area 224, however, are coupled to ground, 5 volt, and signal paths of the printed circuit board.

What is claimed is:

1. In a computer system supplying a first and a second voltage to a first and a second component, respectively, a method for utilizing either one of the first or second components, comprising the steps of:

receiving a component card in a first area of a socket and a second area of the socket, wherein the component card is electrically coupled to the first component;

receiving the component card in the first area of the socket and the second area of the socket, wherein the component card is electrically coupled to the second component;

supplying the first voltage, data signals and ground signals to the first component through the first area of the socket;

supplying the second voltage to the second component through the second area of the socket and supplying data signals and ground signals to the second component through the first area of the socket, wherein either the first or the second voltage is supplied at one time;

storing the second voltage in first capacitors on the component card for use by the second component when the second voltage is being supplied;

passing the first voltage through second capacitors on the component card for discharge to ground when the second voltage is being supplied, wherein the first voltage is higher than the second voltage.

2. A component card interconnect apparatus for coupling components operating at a first voltage and components operating at a second voltage to a computer system, comprising:

a component card including,
a first group of in-line pins on a first portion of an edge of the card that include first power pins, first ground pins and signal pins;
a second group of in-line pins on a second portion of an edge of the card that include second power pins and second ground pins, wherein the second portion is narrower than the first portion and the second power pins convey a lower voltage than the first power pins;
a third portion of the edge of the card between the first portion and the second portion that is recessed relative to the first portion and the second portion such that a distance from the third portion of the edge to an opposite edge of the card is less than a distance from the first and second portions to the opposite edge;

first capacitors coupled to traces of the card on a same side of the card as the first portion of the edge, wherein when components on the card are coupled to the second power pins, each of the first capacitors are connected through one terminal to a power pin of the first group of pins and through another terminal to a ground pin of the first group of pins; and second capacitors coupled to traces of the card on a same side of the card as the second portion of the edge, wherein when components on the card are coupled to the second power pins, each of the first capacitors is coupled between a power pin of the second group of pins and a power pin of the first group of pins to sustain a voltage conveyed on power pins of the second group of pins; and a component socket including, a first area that receives the first group of in-line pins and conveys the first voltage; and a second area that receives the second group of in-line pins and conveys the second voltage.

3. The component card interconnect apparatus of claim 2, wherein the first and second groups of pins are dual in-line pins.

4. The component card interconnect apparatus of claim 2, wherein the first and second groups of pins are single in-line pins.

5. The component card interconnect apparatus of claim 3, wherein the component card is a dual in-line memory module (DIMM).

6. The component card interconnect apparatus of claim 4, wherein the component card is a single in-line memory module (SIMM).

* * * * *